Oct. 27, 1936.  E. RENO  2,058,505

INTERNAL COMBUSTION ENGINE

Filed Sept. 23, 1935  2 Sheets-Sheet 1

Patented Oct. 27, 1936

2,058,505

UNITED STATES PATENT OFFICE 2,058,505

INTERNAL COMBUSTION ENGINE

Emile Reno, Chabreloche, France

Application September 23, 1935, Serial No. 41,823
In France September 24, 1934

3 Claims. (Cl. 123—78)

The present invention relates to internal combustion engines, of the type including a precombustion chamber.

The object of the present invention is to provide an engine of this type which works in a more satisfactory manner than engines of the same kind made up to this time.

The essential feature of the present invention consists in the provision of means for varying the volume of the combustion chamber during the cycle of operation of the engine. This volume, which is maximum at the time of the fuel inflow, decreases and becomes zero, or nearly so, during the periods of ignition and expansion. As the communication between the precombustion chamber and the cylinder is suitably devised, the first result of this arrangement is to produce a rise of the pressure in the precombustion chamber and thus to improve mixing and combustion. On the other hand, the burning gases are violently expelled into the cylinder and, due to this action, they are subjected to a violent stirring, which is very favorable to the combustion. Finally, the fact that the volume of this precombustion chamber becomes zero, or substantially so, before reassuming its normal value, at the beginning of the next cycle of operations, ensures that the whole of the burnt gases is expelled from said chamber, and that said chamber is satisfactorily filled with air for the working of the next cycle of operations.

Another feature of the present invention lies in a special arrangement of the conduits connecting the combustion chamber with the cylinder.

Still another feature of the present invention lies in the arrangement of the movable element the displacements of which produce the variations of volume of the precombustion chamber.

Still another feature of the invention, relating to the case of a two cylinder engine, lies in the provision of a special scavenging system.

Other features of the invention will result from the following detailed description of some specific embodiments thereof.

Preferred embodiments of the present invention will be hereinafter described, with reference to the accompanying drawings, given merely by way of example, and in which.

Figure 2:
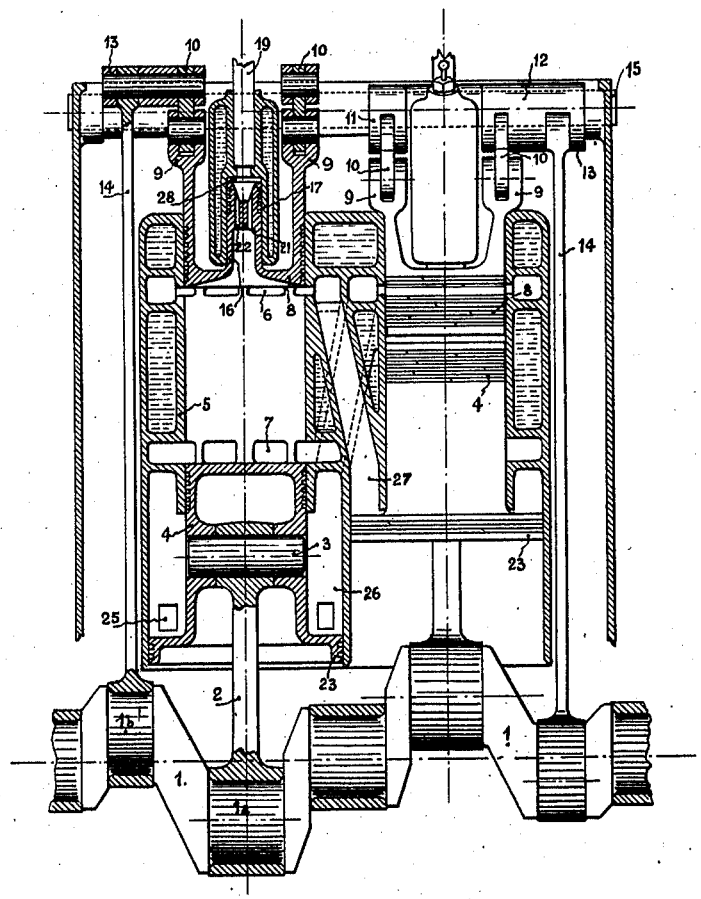

The embodiment shown by the drawings concerns a two-cylinder engine of the two-stroke type. In the cylinders 5 of this engine, there are fitted pistons 4, which drive a crank shaft 1 through wrist pins 3 and connecting rods 2. The crank pins 1a of the crankshaft are arranged in an angular relation at 180° to each other, as shown by Fig. 2.

In each cylinder 5, there are provided, at the upper part, air inlet ports 6, and, at the lower part, gas exhaust ports 7.

The upper end of each cylinder is closed by a movable end piece or piston 8, which is given a movement opposed to that of piston 4, and, as a rule of smaller amplitude.

In the example shown by the drawings, this movable part 8 is connected to a crank pin 1b of the crankshaft, this crank pin 1b being in a plane at 180° to that of the plane of the corresponding crank pin 1a to which it corresponds.

For this purpose, movable part 8 is provided with lugs 9 connected, through articulated shackles 10, to crank arms 11 pivoted about a shaft 15 carried by the engine frame. The hub 12 of the crank arms 11 is rigid with another crank arm 13, which is coupled, through a connecting rod 14, with the crank pin 1b above referred to.

The movable part 8, which has a fluidtight fit in cylinder 5, for instance owing to the provision of packing rings such as are used for an ordinary piston, carries, at its upper end, a piston 16 of smaller diameter, fitting, also in a fluidtight manner, in a stationary cylinder 17, formed in the stationary end 18 of the cylinder, and which contains the precombustion chamber 28, whereby the volume of said chamber varies when part 8, together with piston 16, is caused to move.

Into chamber 28, open, on the one hand, the fuel injector 19 through which fuel is fed to the cylinder, and, on the other hand, eventually, a heating device 20, called starting ignition device, intended to be used for starting the engine.

The gases in the pre-combustion chamber can pass into the combustion chamber of the main cylinder through passages 22 provided around a central core 21.

The lower part of the skirt of each piston 4 is made of larger diameter so as to form another piston 23 sliding in a cylinder 24 consisting of a prolonged part of the cylinder 5 corresponding to said piston.

These parts 23—24 form, in combination, a scavenging pump, the body of which encloses a variable volume cavity 26 into which air is admitted through ports 25 of cylinder 24. The scavenging pump thus associated with each cylinder of the engine discharges air into the other cylinder through a conduit 27 connecting the pump chamber 26 with the air inlet ports 6 of said other cylinder. Each of the cylinders of an engine according to the present invention thus ensures, automatically but very simply, the scavenging in the other cylinder, owing to the fact that there is an angular difference of 180° between the cycles of operation of the two cylinders of the engine, as above explained.

Figure 4:
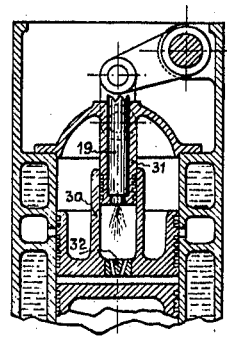
Fig. 4 is a view, similar to Fig. 1, of a modification.

The modification shown in Fig. 4 differs from the example just above described merely in that cylinder 30, which encloses the combustion chamber is movable and rigid with the movable end piece of the cylinder, while the piston 31 that cooperates with said combustion chamber is stationary and carries the fuel injector 19. The passage affording communication between the combustion chamber and the inside of the cylinder contains a central core 32 around which are provided oblique conduits.

Figure 1:
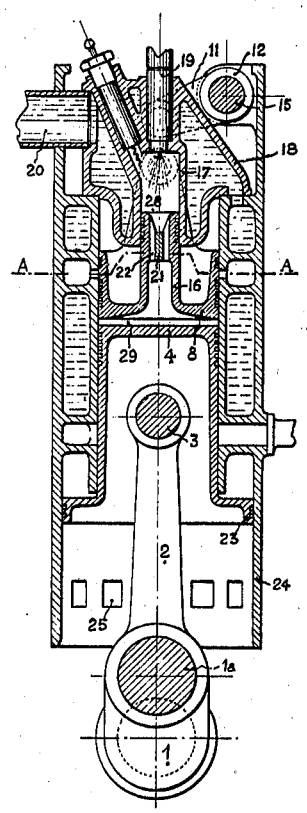
Figs. 1 and 2 are vertical sectional views, respectively in a transverse direction and in a longitudinal direction, of an engine according to the present invention.
Figure 3:
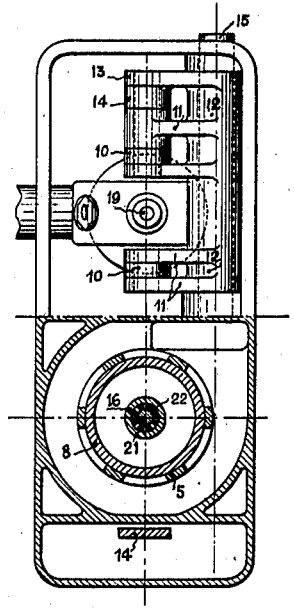
Fig. 3 is a plan view, partly in section on the line A—A of Fig. 1, of the engine according to the invention.

The engine according to the present invention works in the following manner:

At the beginning of the cycle of operations, piston 4 is at the top of its upward stroke, and the double piston 8—16 is at the bottom of its downward stroke, so that the volume of the precombustion chamber is maximum (position of Fig. 1).

During the power stroke, the piston 4 is caused to move downwardly, and when it comes near to its lowermost position, the burnt gases escape through ports 7, while the corresponding scavenging pump is brought into the position corresponding to the inflow of air, due to the fact that ports 25 are uncovered.

During this power stroke, on the other hand, the double piston 8—16 has moved upwardly and, near the end of its upward stroke, it has uncovered ports 6 (position of the cylinder on the left hand side of Fig. 2). This takes place when the scavenging pump associated with the other cylinder (right hand side cylinder of Fig. 2, at the time considered) is at the end of its discharge stroke, which ensures the scavenging of the first mentioned cylinder.

On the other hand, the upward movement of the double piston 8—16 has expelled, into the main combustion and expansion chamber 29 (existing, in cylinder 5, between pistons 4 and 8) the gases present in the precombustion chamber, thus ensuring a violent stirring of the gases and, accordingly, their homogenizing and their full combustion.

I thus avoid a drawback which occurs frequently in engines having a precombustion chamber of fixed volume, this drawback being that the fuel remains partly in the precombustion chamber, in contact with an insufficient amount of air, and is not wholly burnt. The above mentioned advantage of the engine according to the present invention is all the greater as the gases are compelled to flow through the system 21—22 and are thus given a whirlwind motion.

On the other hand, the upward movement of piston 16 in cylinder 17 produces a rise of the gaseous pressure in chamber 28, due to the resistance created at 21—22 to the outflow of these gases, which improves the thorough mixing and the combustion of the gases in this chamber 28.

It should also be noted that the double piston 8—16 is given a driving impulsion due to the action of the gaseous pressure on the surface of piston 8 minus that of piston 16, whereby the engine according to the present invention has all the advantages of engines having two pistons per cylinder, and, especially a very satisfactory balancing of the alternating inertia stresses.

At the end of this first stroke, the volume of the precombustion chamber 28 becomes very small, and even practically equal to zero. This precombustion chamber is thus, without any doubt, freed from the burnt gases.

During the next stroke, piston 4 moves upwardly while the double piston 8—16 moves downwardly. At the same time as it is compressed, air fills up the precombustion chamber 28 as the volume of said chamber increases.

At the end of the compression, fuel is injected through injector 19 and ignites and a new cycle of operation is again started.

It should be noted that the system 21—22 through which air is admitted into the combustion chamber also gives said air a whirlwind motion which improves its mixing with the fuel and the ignition of the fuel mixture.

During the second stroke, which has just been described (upward movement of the power cylinder), the piston 23 of the scavenging pump associated with the cylinder that is considered compresses the air present in the pumping chamber 26 as soon as said piston has covered ports 25. The air thus compressed serves, according to the mode of working above described, to the scavenging in the other cylinder when the air inlet ports of the latter are uncovered in the same manner as above described.

Of course, I might make use of any other means for varying the volume of the precombustion chamber. I might also provide two-stroke engines with air and fuel distribution systems different from those described above. I might also make use of scavenging means wholly different from those above described with reference to the drawings.

In a general manner, while I have, in the above description, disclosed what I deem to be particularly practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an internal combustion engine of the type described, the combination of a stationary cylinder, a piston movable in said cylinder so as to form therein a combustion chamber of variable capacity, a part rigid with said cylinder, a part movable with respect to said cylinder, one of the two last mentioned parts having a cylindrical recess formed therein, a piston rigid with the other of these two parts adapted to fit in said cylindrical recess so as to form a precombustion chamber of variable volume therein, a fuel injection valve opening into said precombustion chamber, one of these two parts being provided with a passage connecting said precombustion chamber with said combustion chamber of the cylinder, and means for operatively connecting said movable part with said first mentioned piston so that the volume of said precombustion chamber decreases during the power stroke of said first mentioned piston, becoming substantially equal to zero at the end of said stroke, and increases, up to its maximum value, during the next stroke of said first mentioned piston.

2. In an internal combustion engine of the type described, the combination of a stationary cylinder, a piston movable in said cylinder so as to form therein a combustion chamber of variable capacity, a cylindrical element rigidly carried by said cylinder, an end piece for said cylinder movably fitting therein, a piston element rigid with said movable end piece and fitting slidably in said cylindrical element, so as to form a precombustion chamber enclosed between said cylindrical element and said piston element, a fuel injection valve opening into said precombustion chamber, said piston element being provided with at least one passage connecting said precombustion chamber with the combustion chamber inside the first mentioned cylinder, and means for operatively connecting said movable end piece with said first mentioned piston so that the volume of said precombustion chamber decreases during the power stroke of said first mentioned piston, becoming substantially equal to zero at the end of said stroke, and increases, up to its maximum value, during the next stroke of said first mentioned piston.

3. In an internal combustion engine of the type described, the combination of a stationary cylinder, a piston movable in said cylinder so as to form therein a combustion chamber of variable volume, a piston element rigidly carried by said cylinder, a cylindrical element adapted to fit with said piston element slidably mounted inside said cylinder, so as to form a precombustion chamber enclosed between said cylindrical element and said piston element, a fuel injection valve opening into said precombustion chamber, said cylindrical element being provided with at least one passage connecting said precombustion chamber with the combustion chamber inside the first mentioned cylinder, and means for operatively connecting said movable cylindrical element with said first mentioned piston so that the volume of said precombustion chamber decreases during the power stroke of said first mentioned piston, becoming substantially equal to zero at the end of said stroke, and increases, up to its maximum value, during the next stroke of said first mentioned piston.

EMILE RENO.